United States Patent
Chi

Patent Number: 5,688,454
Date of Patent: Nov. 18, 1997

[54] FLOATING BOARD FABRICATION METHOD

[76] Inventor: Kuan-Min Chi, No. 118, Ta-Jung E. St., Taichung, Taiwan

[21] Appl. No.: 731,482

[22] Filed: Oct. 17, 1996

[51] Int. Cl.⁶ .................................................. B29C 67/20
[52] U.S. Cl. ......................... 264/129; 264/162; 264/237; 264/321
[58] Field of Search ................. 264/161, 55, 321, 264/129, 162, 237

[56] References Cited

U.S. PATENT DOCUMENTS

| | | | |
|---|---|---|---|
| 3,812,225 | 5/1974 | Hosoda et al. | 264/321 |
| 4,671,910 | 6/1987 | Fuhrmann | 264/55 |
| 4,850,913 | 7/1989 | Szabad, Jr. | 441/65 |
| 4,952,352 | 8/1990 | Shin | 264/55 |
| 4,976,902 | 12/1990 | Oberle | 264/55 |
| 5,350,544 | 9/1994 | Bambara et al. | 264/321 |
| 5,489,228 | 2/1996 | Richardson et al. | 441/74 |

FOREIGN PATENT DOCUMENTS

| | | | |
|---|---|---|---|
| 2000226 | 4/1990 | Canada | 264/321 |
| 48-5103 | 2/1973 | Japan | 264/321 |
| 59-155019 | 9/1984 | Japan | 264/321 |

*Primary Examiner*—Allan R. Kuhns
*Attorney, Agent, or Firm*—Bacon & Thomas

[57] ABSTRACT

A floating board fabrication method including the steps of: (a) preparing a PE plate from foamed polyethylene by cutting, (b) grinding the PE plate to smooth the periphery, (c) instantly heating the PE plate thus obtained at about 180° C. for about 4 minutes, (d) quickly cooling down the PE plate through a hydraulic cooling press at 4° C., and (e) trimming the periphery of the PE plate thus obtained, polishing its surface, and coating its surface with a paint, so as to obtain a finished product.

3 Claims, 3 Drawing Sheets

FLOATING BOARD FABRICATION METHOD

BACKGROUND OF THE INVENTION

The present invention relates to a floating board fabrication method which instantly heats foamed PE plate and then quickly cools it down so that the finished floating board is free from the effect of the weather.

Floating boards are intensively used in water sports to assist people to float in the water. FIG. 1 shows a regular floating board for this purpose. This structure of floating board is made from foamed EVA (ethylene vinyl acetate) by heat pressing. After molding, the finished product is gradually cooled in the air. Because this structure of the floating board is instantly heated and then slowly cooled down, the finished product tends to deform. During the heating process, if the heating temperature is not strictly controlled, the material property of foamed EVA tends to be destroyed. Therefore, this conventional floating board manufacturing process is difficult to maintain the quality of the finished product. Furthermore, the slow manufacturing speed relatively increases the manufacturing cost of the finished product.

SUMMARY OF THE INVENTION

The present invention has been accomplished to provide a floating board fabrication method which eliminates the aforesaid drawbacks. It is the main object of the present invention to provide a floating board fabrication method which instantly heats foamed PE plate, and then quickly cools it down so that the floating board manufacturing speed is greatly improved, and the finished floating board is free from the effects of the weather. According to the present invention, the floating board is made from foamed polyethylene through the procedures of (a) cutting, (b) grinding, (c) instant heating, (d) quick cooling, and (e) finishing.

DETAILED DESCRIPTION OF THE PREFERRED EMBODIMENT

Figure 1:
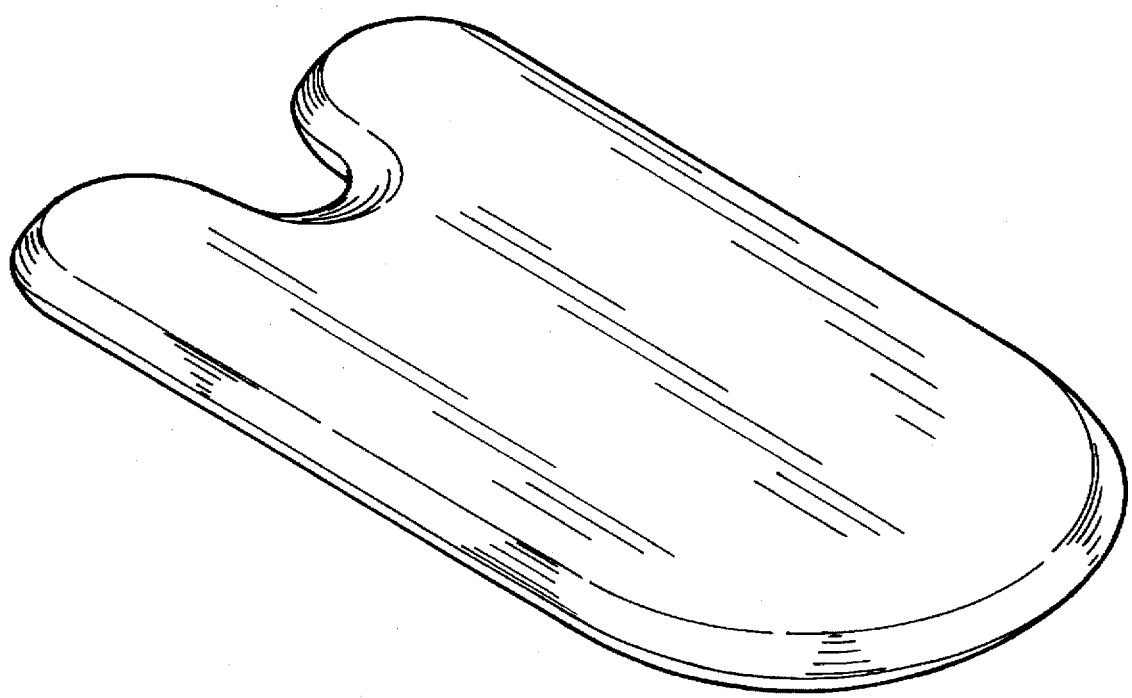
FIG. 1 is an elevational view of a regular floating board.
Figure 2:
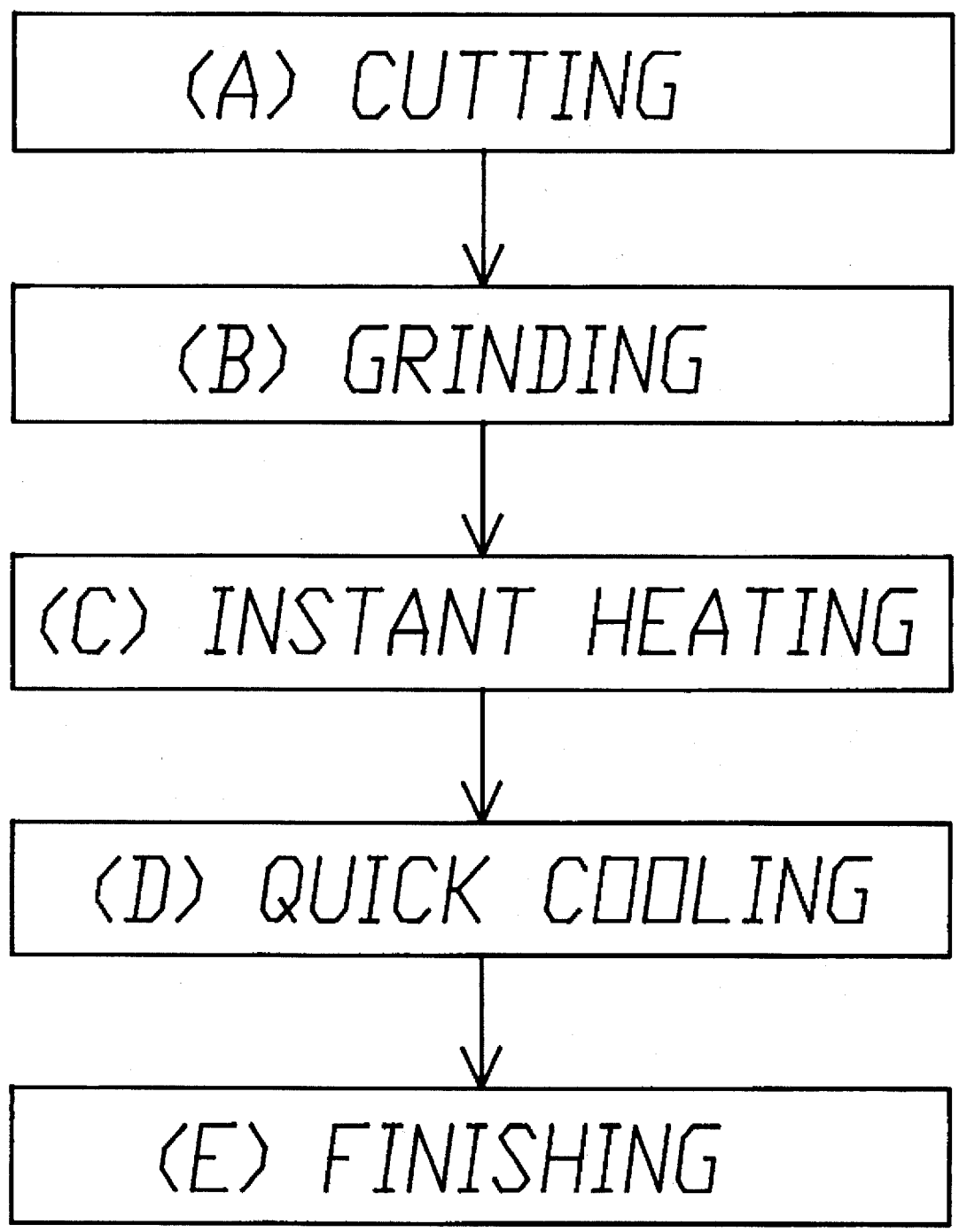
FIG. 2 is a production flow chart according to the present invention.
Figure 3:
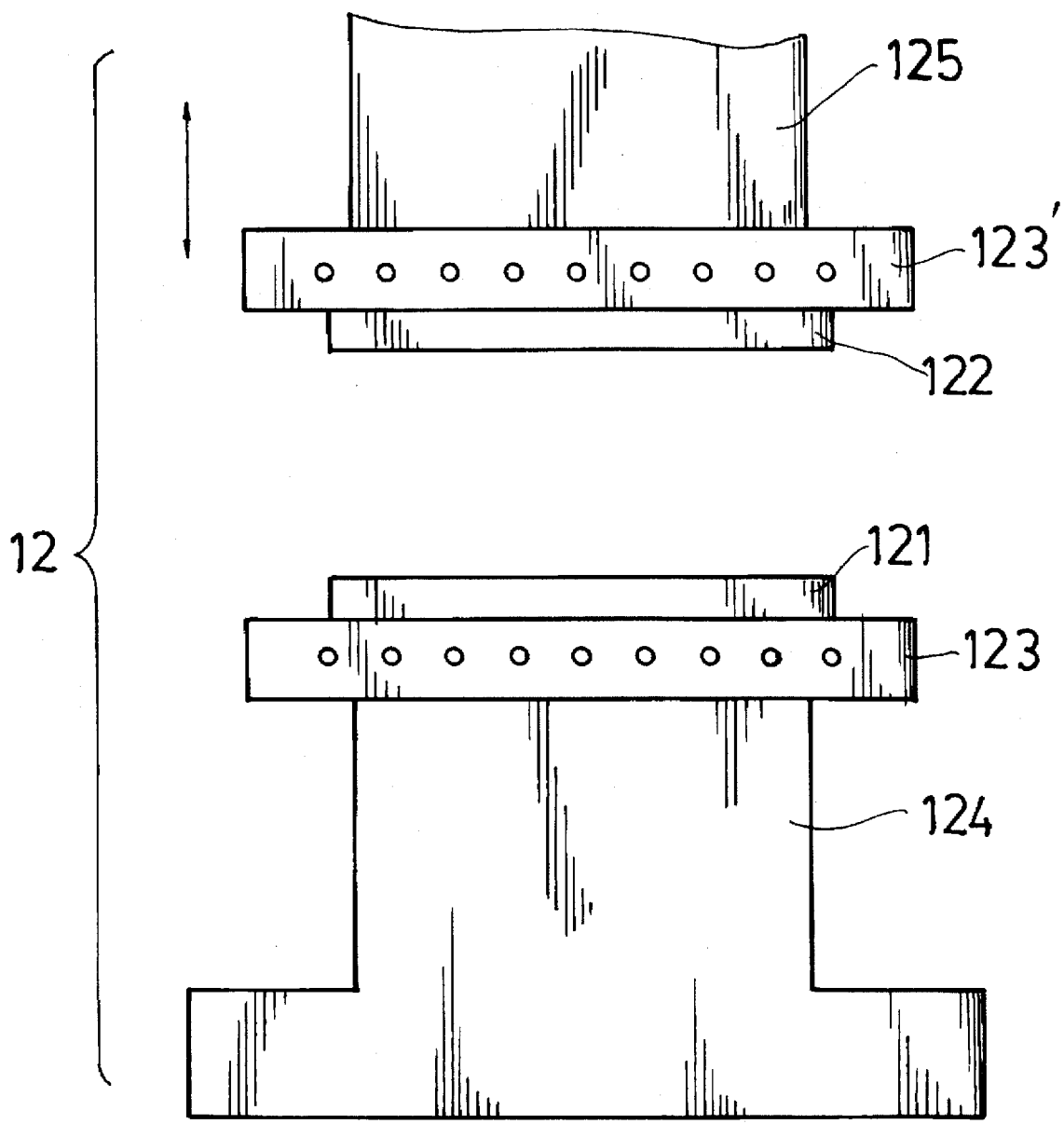
FIG. 3 shows the structure of a hydraulic cooling press used in the floating board fabrication process according to the present invention.

Referring FIG. 2, a floating board fabrication method in accordance with the present invention comprises the steps of:

(a) preparing a PE plate from foamed polyethylene and then cutting it into a substantially rectangular shape in size corresponding to and slightly larger than the desired finished product;

(b) grinding the PE plate to smooth the periphery;

(c) instantly heating the PE plate thus obtained by hot air at about 180° C. (effective temperature range is within 175° C. to 185° C.) for about 4 minutes, causing the PE plate to expand;

(d) quickly cooling down the PE plate through a hydraulic cooling press 12 (see FIG. 3) at 4° C.; and (e) trimming the periphery of the PE plate thus obtained, polishing its surface or coating its surface with a paint, so as to obtain a finished product.

The aforesaid hydraulic cooling press 12 is comprised of a fixed bottom die 121, and a movable upper die 122. The bottom die 121 is fixedly fastened to a fixed machine table 124. The tipper die 122 is installed in a lifter 125 and moved with it. Cooling plates 123 and 123' are respectively mounted on the bottom die 121 and the upper die 122 to indirectly transmit cold temperature to the workpiece which is put on the bottom die 121. The cooling temperature is preferably at 4° C.

Because the floating board is made from foamed polyethylene, it is lightweight and its floating power is high, and its porous structure is practical for manufacturing process of instant heating and quick cooling. When the PE plate is instantly heated by hot air at about 180° C., hot temperature is evenly distributed to all area of the PE plate. Therefore, the finished floating board does not deform when it is exposed to the radiation of the sun for a length of time. Because the expanded PE plate is quickly cooled down through a hydraulic cooling press, the cooling process can be quickly done, and the PE plate can be maintained in shape. Because this instantly heating and quickly cooling floating board manufacturing process is simple and efficient, the manufacturing efficiency is high, and the manufacturing cost is low. Furthermore, through the process of instantly heating and quickly cooling, the finished floating board can be constantly maintained in shape, and will not be caused to deform by weather.

I claim:

1. A floating board fabrication method including the steps of:

a) preparing a PE plate from foamed polyethylene and then cutting it into the desired shape corresponding to and slightly larger than the designed finished product;

b) grinding the PE plate to smooth the periphery;

c) instantly heating the PE plate thus obtained at a temperature within an effective temperature range of 175° C. to 185° C. for about 4 minutes, causing the PE plate to expand;

d) quickly cooling down the PE plate through a hydraulic cooling press at 4° C., causing the PE plate to contract; and e) trimming the periphery of the PE plate thus obtained, polishing its surface, and coating its surface with a paint, so as to obtain a finished product.

2. The floating board fabrication method of claim 1 wherein the step of instantly heating the PE plate comprises heating the PE plate by hot air.

3. The floating board fabrication method of claim 1 wherein the heating temperature is 180° C.

* * * * *